Oct. 2, 1956
J. R. MAYFIELD
2,764,840
RAT BAIT SELF-FEEDER
Filed Feb. 8, 1954
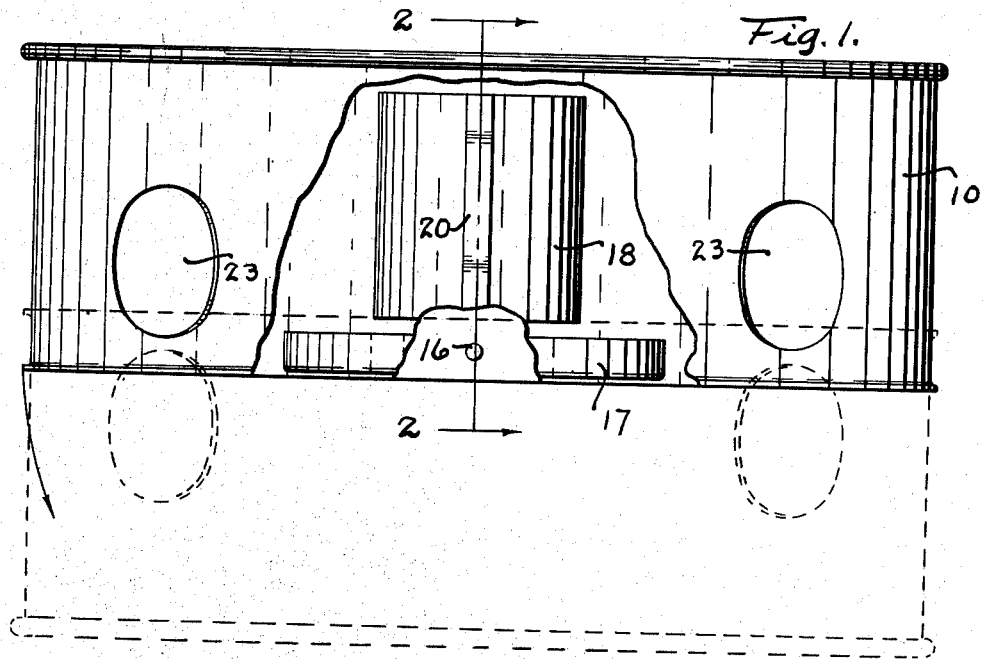
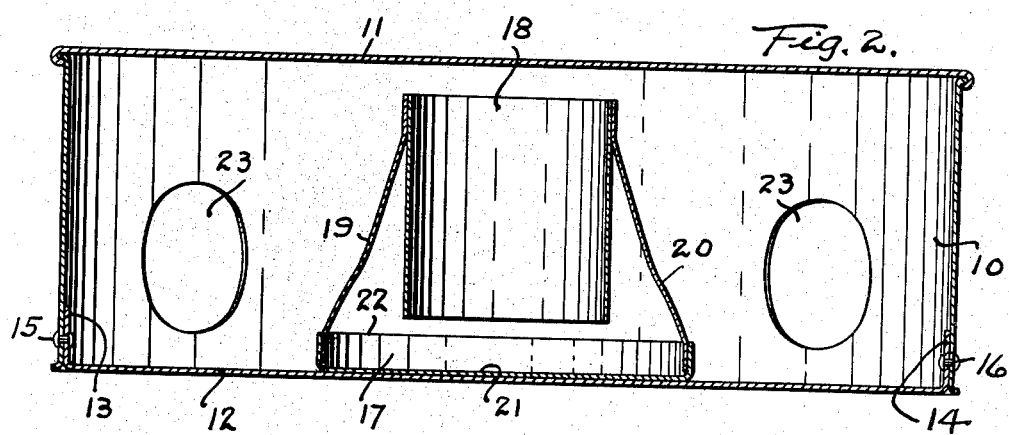
INVENTOR
JAMES R. MAYFIELD,
By Herbert Q. Winturn,
ATTORNEY

United States Patent Office 2,764,840
Patented Oct. 2, 1956

---

2,764,840

RAT BAIT SELF-FEEDER

James R. Mayfield, Indianapolis, Ind.

Application February 8, 1954, Serial No. 408,698

1 Claim. (Cl. 43—131)

This invention relates to a structure to be employed as a bait self-feeder for both rats and mice, wherein the bait is of a comparatively free flowing type, and is to be carried in a reservoir which is readily available and need not be turned over at any time for filling or dispensing the bait.

A primary object of the invention is to provide a structure which will be of a relatively low cost in manufacturing, and yet will be highly serviceable and quite attractive to rats, mice, and similar rodents which are attracted by the bait. A further important object of the invention is to provide a bait carrying receptacle within a housing such that the bait receptacle while open at the top is covered over by the housing, and yet the housing itself is revolvably mounted in respect to the receptacle so that the receptacle may at all times remain upright both for filling and dispensing of the bait.

These and many other objects and advantages of the invention will become apparent to those versed in the art, in the following description of one particular form of the invention, as illustrated in the accompanying drawing, in which Fig. 1 is a view in side elevation with a portion of the receptacle wall broken away; and Fig. 2 is a vertical, diametrical section on the line 2—2 in Fig. 1.

A generally cylindrical housing 10 is formed to be entirely open across its under side, and closed by a cover 11 across its upper end. A bar 12 is provided to extend diametrically across the under side of the housing 10, and is provided at each end with the respective upturned legs 13 and 14. Each of these legs 13 and 14 is rockably attached to the side wall of the housing 10 by any suitable means, herein shown as by means of the rivets 15 and 16. Thus the bar 12 is free to rock around these rivets 15 and 16 as pivot points.

Mounted centrally on the bar 12 is a pan 17, fixed in position on that bar. There is supported above the bar 17 a cylinder 18 open at both the top and bottom ends, the support being of any suitable nature, herein shown as comprising the two arms 19 and 20 which are fixed respectively to the upper end portion of the cylinder 18 and the side wall of the pan 17. The cylinder 18 is simply a tubular piece of metal, and its lower end is spaced sufficiently above the floor 21 of the pan 17 to permit the bait which is placed in the cylinder 18 to flow outwardly from its under edge into the pan 21. This flow is to be limited of course so it does not reach normally the top edge 22 of the pan 17.

The structure is in its normal position as indicated in both Figs. 1 and 2 by the solid lines. However when the cylinder 18 is to be filled with bait, the operator will reach under the housing 10 and hold the pan 17 or cylinder 18 with one hand, and then revolve the housing 10 about the rivets 15 and 16 to allow it to swing around 180 degrees in the direction of the arrow for example (may swing from the other side downwardly), to the lowermost position as indicated by the dash lines in Fig. 1 so that the cylinder 18 is still in its upwardly, vertically disposed position the same as it was originally as shown by the solid lines. The operator of course would change hands as the housing 10 is swung relatively around the bar 12. The bait (not shown) may be poured into the upper end of the cylinder 18 to allow it to flow down and come to rest on the floor 21 of the pan 17, and then while the cylinder 18 is still held in this same position, the housing 10 is swung around and up over the cylinder 18 to the position as shown in Figs. 1 and 2 in the solid lines. Thus, there need be no other cover to the cylinder 18 than the cover 11 used on the housing 10. The dimensions of the cylinder 18, particularly in respect to the clearance of its upper end from the cover 11 are such that the housing 10 is free to turn around without being restricted by the cylinder 18, or even coming in contact therewith. The housing 10 is shown with rodent entry holes 23 through the said wall of the housing 10.

Thus it is to be seen that I have provided a very simple, yet most effective structure for the purposes indicated, and while I have shown this structure in the one particular form, it is obvious that structural changes may be employed without departing from the spirit of the invention, and I therefore do not desire to be limited to that one particular form beyond the limitations which may be imposed by the following claim.

I claim:

A rat bait feeder comprising a housing having a top and a side wall with entrance openings; a flat bottom feeder pan; an open end tube supported by the pan and extending upwardly for its full length with its lower end spaced about said pan; and a bar extending across said housing at the bottom of said side wall and pivoted by its ends thereto; said pan being fixed to said bar; said tube terminating at its upper end adjacent said top; said bar normally positioning said pan at its bottom closely adjacent the surface supporting said housing and maintaining the pan and tube against rocking; and the spacing of the upper end of said tube from said top being that which will permit the tube and pan to be rocked from said normal position 180 degrees for filling.

References Cited in the file of this patent

UNITED STATES PATENTS

| | | |
|---|---|---|
| 1,048,977 | Larkin | Dec. 31, 1912 |
| 1,321,360 | Bright | Nov. 11, 1919 |
| 1,964,611 | Watson | June 26, 1934 |
| 2,205,125 | Rose | June 18, 1940 |
| 2,505,396 | Grindstaff | Apr. 25, 1950 |
| 2,568,168 | Query | Sept. 18, 1951 |
| 2,664,663 | Mullen | Jan. 5, 1954 |

FOREIGN PATENTS

| | | |
|---|---|---|
| 199,004 | Canada | Apr. 6, 1920 |